(12) United States Patent
Solano

(10) Patent No.: US 10,694,721 B2
(45) Date of Patent: Jun. 30, 2020

(54) DROWN PROOF BEE FEEDER

(71) Applicant: Michael Ray Solano, Blue Ridge, TX (US)

(72) Inventor: Michael Ray Solano, Blue Ridge, TX (US)

(*) Notice: Subject to any disclaimer, the term of this patent is extended or adjusted under 35 U.S.C. 154(b) by 307 days.

(21) Appl. No.: 15/710,631

(22) Filed: Sep. 20, 2017

(65) Prior Publication Data

US 2018/0084763 A1    Mar. 29, 2018

Related U.S. Application Data

(60) Provisional application No. 62/398,617, filed on Sep. 23, 2016.

(51) Int. Cl.
*A01K 47/02* (2006.01)
*A01K 53/00* (2006.01)

(52) U.S. Cl.
CPC .............. *A01K 53/00* (2013.01); *A01K 47/02* (2013.01)

(58) Field of Classification Search
CPC ........ A01K 47/06; A01K 53/00; A01K 39/02; A01K 39/024; A01K 39/026; A01K 7/02; A01K 7/04
USPC .................................................. 449/9–11, 48
See application file for complete search history.

(56) References Cited

U.S. PATENT DOCUMENTS

| | | | | |
|---|---|---|---|---|
| 111,451 A | * | 1/1871 | Hendrick | A01K 53/00 449/10 |
| 562,853 A | * | 6/1896 | Rooker | A01K 53/00 449/10 |
| 968,613 A | * | 8/1910 | Ostrand | A01K 7/00 119/72 |
| 1,056,266 A | * | 3/1913 | Danzenbaker | A01K 53/00 449/10 |
| 1,108,277 A | * | 8/1914 | Thale | A01K 53/00 449/10 |
| 1,461,950 A | * | 7/1923 | Toth | A01K 47/00 449/10 |
| 1,518,018 A | * | 12/1924 | Harlan | A01K 39/026 119/77 |
| 2,193,741 A | * | 3/1940 | Roberts, Jr. | A01K 53/00 449/11 |
| 3,714,929 A | * | 2/1973 | Boterweg | A01K 39/024 119/80 |

(Continued)

FOREIGN PATENT DOCUMENTS

GB       483678 A  *  4/1938  ............. A01K 53/00

*Primary Examiner* — Peter M Poon
*Assistant Examiner* — Marisa V Conlon
(74) *Attorney, Agent, or Firm* — Wilson Daniel Swayze, Jr.

(57) ABSTRACT

An apparatus and method for feeding bees is disclosed. The apparatus comprises a fluid tray member, a sheet, and a regulating valve. The fluid tray member is configured to hold a fluid for feeding the bees. The sheet is detachably attached on the fluid tray member via a magnetic strip. The regulating valve attached to the sheet is configured to maintain the level of the fluid. The regulating valve is attached to the sheet via a fastener. The sheet further comprises an inlet tube, a plurality of cavities, and a handle enable a user to position the apparatus to a desired location. The fluid is received via the inlet tube into the fluid tray member. The sheet provides a flat surface around the cavities to support each of the bees while feeding the fluid.

18 Claims, 6 Drawing Sheets

(56) References Cited

U.S. PATENT DOCUMENTS

| | | | | |
|---|---|---|---|---|
| 4,138,967 | A * | 2/1979 | Tamborrino | A01K 7/04 119/78 |
| 4,214,329 | A * | 7/1980 | Kozlowicz | A01K 53/00 449/9 |
| 4,333,189 | A * | 6/1982 | Mentzer | A01K 53/00 449/11 |
| 4,443,904 | A * | 4/1984 | van Muyden | A01K 53/00 449/10 |
| 4,470,371 | A * | 9/1984 | Strickland | A01K 7/04 119/78 |
| 5,135,021 | A * | 8/1992 | Pegg | E03C 1/02 122/13.3 |
| 5,499,741 | A * | 3/1996 | Scott | B67D 1/0039 222/129.4 |
| 8,475,227 | B2 * | 7/2013 | Volby | A01K 53/00 449/10 |
| 9,854,757 | B2 * | 1/2018 | Carvalho | A01G 27/005 |
| 2014/0261207 | A1 * | 9/2014 | Ho | A01K 7/04 119/78 |
| 2016/0015007 | A1 * | 1/2016 | Sinanis | A01K 47/06 449/2 |
| 2016/0330938 | A1 * | 11/2016 | Jones | A01K 47/06 |

* cited by examiner

DROWN PROOF BEE FEEDER

BACKGROUND OF THE INVENTION

A. Technical Field

The invention disclosed herein generally relates to bee feeding apparatuses. More particularly, the invention disclosed herein relates to a bee feeding apparatus for safely feeding bees without the risk of drowning.

B. Description of Related Art

Bees are flying insects vital to the pollination process. Pollination refers to the process of transferring pollen to the female reproductive organs of a plant, enabling fertilization to take place. Additionally, bees also produce honey and beeswax. Traditionally, humans have kept honeybee colonies, commonly in hives. Beekeepers collect honey, beeswax, etc., from these bee colonies for consumption or commercial purposes. Typically, the bees are fed fluids, for example, water, sugared water, etc., by the beekeepers. Bees need flat, stable landing places in order to drink water from a pool. In swimming pools and birdbaths, they have to try to drink while hovering or sit on the edge and try to reach the water. Bees are vital to the growth of plants through pollination and significant losses can occur as they try to acquire water from dangerous sources. An apparatus, which provides a stable flat landing place for bees to stand and feed from the tray, is required. Currently, bees often find sources of hydration that are very dangerous to them. The bees get pushed by other bees crowding around or just inadvertently fall into the water.

Moreover, many synthetic pools and fishponds have steep sides and the water does not come all the way to the top. The bees cannot climb the walls. If they fall in the water, they get fatigued and drown. This also occurs in birdbaths, wading pools, commercial bee water feeders, and many other water pools. An apparatus, which provides sufficient fluids to feed bee colonies without drowning the bees, is required. Hence, there is a long felt but unresolved need for an apparatus, which provides a stable flat landing place for bees to stand and feed from the tray. Furthermore, there is a need for an apparatus, which provides sufficient fluids to feed bee colonies without drowning the bees.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The bee feeding apparatus, disclosed herein, addresses the above-mentioned need for an apparatus, which provides a stable flat landing place for bees to stand and feed from the tray. Furthermore, the bee feeding apparatus addresses the need for an apparatus, which provides sufficient fluids to feed bee colonies without drowning the bees. The bee feeding apparatus is capable of watering or feeding hundreds of bees safely. The apparatus comprises a fluid tray member, a sheet, and a regulating valve. The fluid tray member is configured to hold a fluid for feeding the bees. The fluid tray member is made of a stainless steel or alloy material, wherein the material is adhesively bonded to the interior of the fluid tray member. The fluid tray member further comprises one or more longitudinal curved ribs to strengthen the fluid tray member. The sheet is detachably attached on the fluid tray member via one or more magnetic strips. The regulating valve attached to the sheet is configured to maintain the level of the fluid. The regulating valve is attached to the sheet via one or more fasteners. The sheet further comprises an inlet tube, a plurality of cavities, and a handle. The fluid is received via the inlet tube into the fluid tray member. The handle is detachably attached to the sheet via one or fasteners wherein the handle enables a user to position the apparatus to a desired location.

In an embodiment, a method for feeding bees is disclosed. The method comprises the following steps: In the first step, an apparatus comprising a fluid tray member and a perforated sheet is provided. In the second step, a fluid is received into the fluid tray member via an inlet tube positioned on the perforated sheet. In the third step, the level of the fluid is maintained or regulated within a plurality of cavities of the perforated sheet via a regulating valve, positioned on the perforated sheet. The regulating valve is a float valve comprising a hollow silicone rubber ball, wherein the silicone rubber ball seals against an interior opening inside the cavity of the perforated sheet, thereby holding the fluid level below the surface level of the perforated sheet. In the next step, the bees fetch/access the fluid from the apparatus to feed themselves. The bees fetch/access the fluid from the said plurality of cavities of the perforated sheet.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
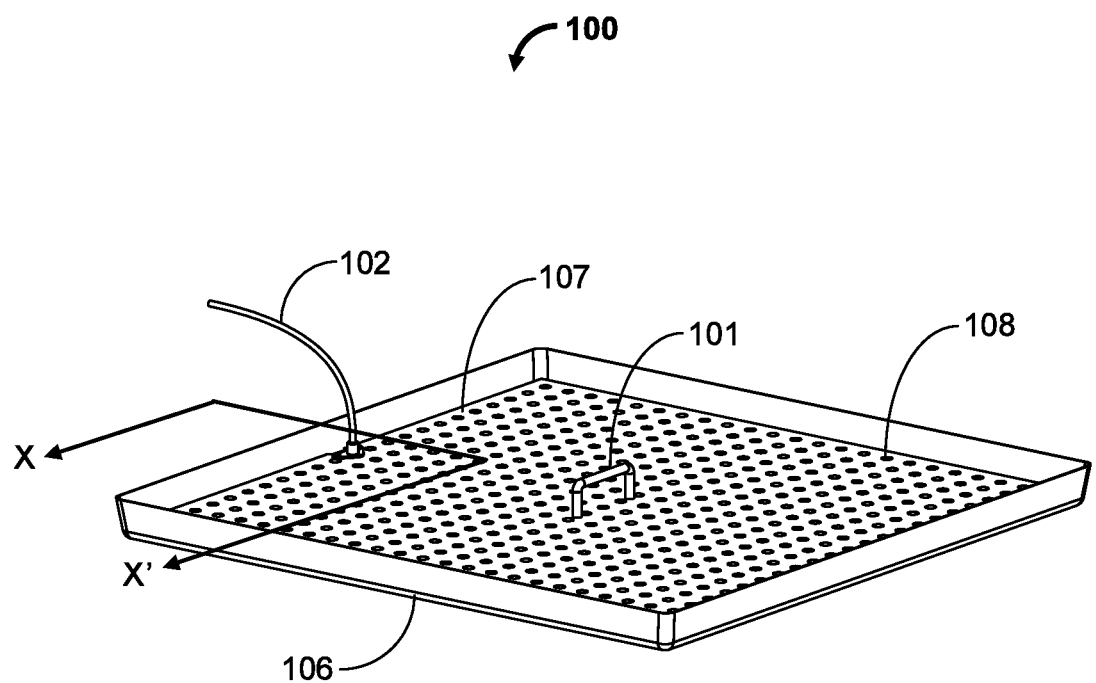
FIG. 1 exemplarily illustrates a top perspective view of a bee feeding apparatus.
Figure 2:
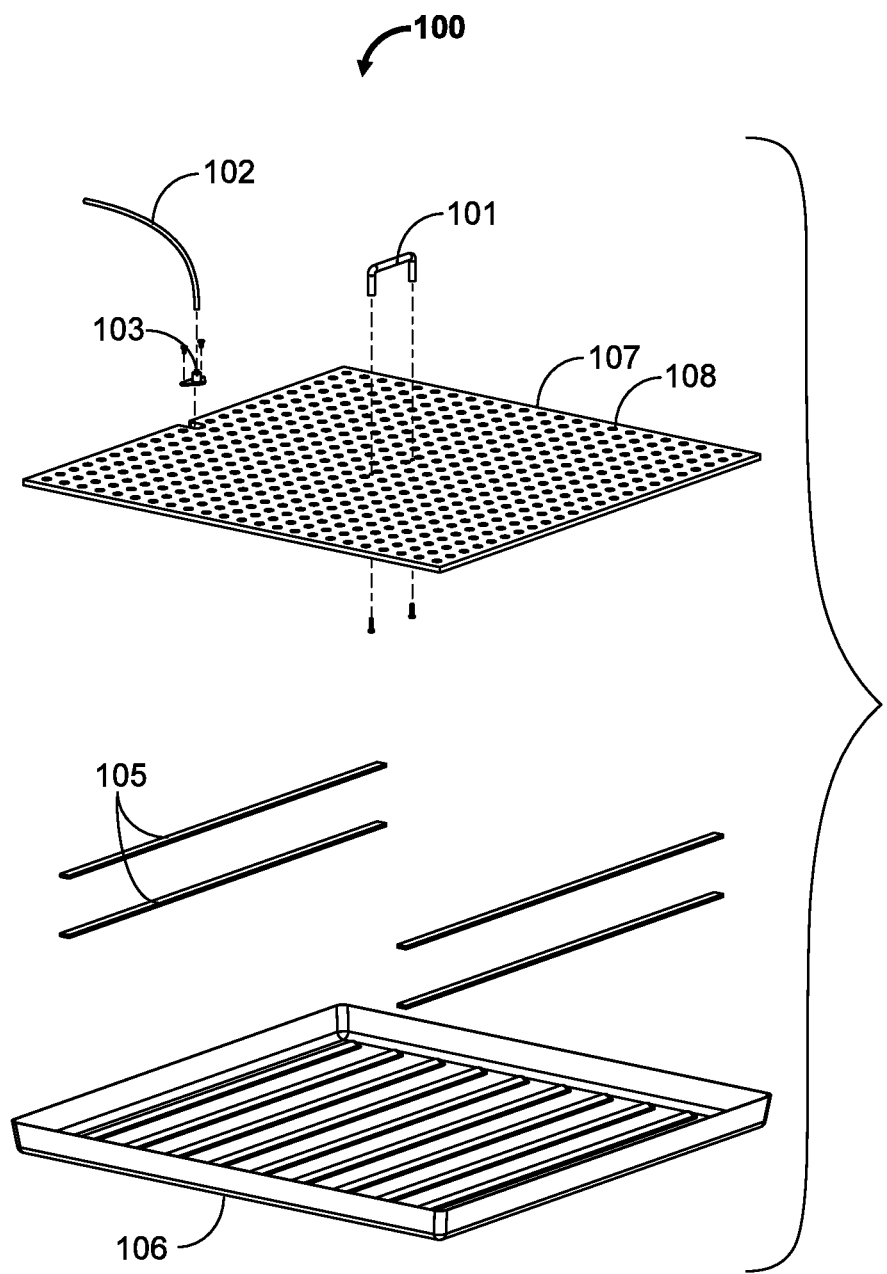
FIG. 2 exemplarily illustrates an exploded view of a bee feeding apparatus.

FIG. 1 exemplarily illustrates a top perspective view of a bee feeding apparatus 100. FIG. 2 exemplarily illustrates an exploded view of a bee feeding apparatus 100. The bee feeding apparatus 100, disclosed herein, comprises a fluid tray member 106, a sheet 107 and a regulating valve 103. In an embodiment, the sheet 107 comprises an inlet tube 102, a handle 101, and a plurality of cavities 108. In an embodiment, the fluid tray member 106 is, for example, a food grade plastic tray. The sheet 107 is detachably attached to the fluid tray member 106 via one or more magnetic strips 105. The fluid tray member 106 is vacuum formed in a single piece to make the fluid tray member 106 leak free and easy to clean. In an embodiment, the fluid tray member 106 is configured to receive a fluid via the inlet tube 102. The handle 101 is detachably attached to the sheet 107 via one or more fasteners. In an embodiment, the fluid is supplied to the cavities 108 via the inlet tube 102. The fluid line is kept at a suitable level by adjusting the regulating valve 103, for example, the adjustable internal float valve, partially filling the cavities 108 so the bees can drink but not drown. The commercially available handle 101 is secured to the sheet 107 using the fasteners. For example, the fastener for attaching the handle 101 is a stainless steel fastener. In an embodiment, the handle 101 is made from a plastic material, which is rust resistant, corrosion resistant, and reinforced to resist breakage.

In an embodiment, the sheet 107 is a perforated sheet. The sheet 107 is made of a food grade high-density polyethylene (HDPE) plastic material. The sheet 107 is water jet machined to shape and all the cavities 108 are formed. The machined sheet 107 is then transferred to a computer numerically controlled (CNC) machining center. The feeding/drinking cavities 108 are countersunk, and any cavities 108 are tapped that need it. The corners of the ¼" thick food grade plastic sheet 107 are held down by one or more stainless steel bars adhesively bonded to the sheet and the one or more magnetic strips 105 are secured in mating location to the bottom of the sheet using one or more stainless steel fasteners. The countersunk cavities 108 hold fluid and the area around the cavities 108 provide a flat stable surface for the bee to stand on. The regulated fluid levels in the cavities 108 ensure feed supply to the bees and prevent them from drowning. If crowding occurs and the bee happens to get pushed into the countersunk cavity 108, they can easily climb out. If the retained water gets stale, the perforated sheet 107 is removed, the fluid tray member 106 and the sheet 107 rinsed, and the bee feeding apparatus 100 quickly reassembled.

The perforated sheet 107 is held in place with 5-pound pull magnetic strips 105 in each corner so it will not be dislodged during use. The magnetic strips 105 are easily removable for routine maintenance. The regulating valve 103 regulates the fluid level within tolerance, keeping it at the ideal safe level. The bee feeding apparatus 100 waters or feeds significantly large numbers of bees safely, promoting beehive health. In an embodiment, the fluid tray member 106 is of a generally square configuration, approximately two feet across. Alternately, smaller sizes and different shapes of the bee feeding apparatus 100 are manufactured based on requirement. The components are easily scalable. The fluid tray member 106 is vacuum molded from a single piece of food grade polypropylene plastic sheet. The plastic material is durable, highly resistant to ultraviolet degradation, impervious to household and cleaning chemicals. In an embodiment, the fluid tray members 106 are supplied in various colors, for example, yellow, which bees really like, or a distinctive color to enhance the product recognition factor, which can dramatically improve the market adoption of the product. The fluid tray member 106 is about 0.1-inch thick and has one or more longitudinal curved ribs to strengthen the fluid tray member 106.

Figure 3:
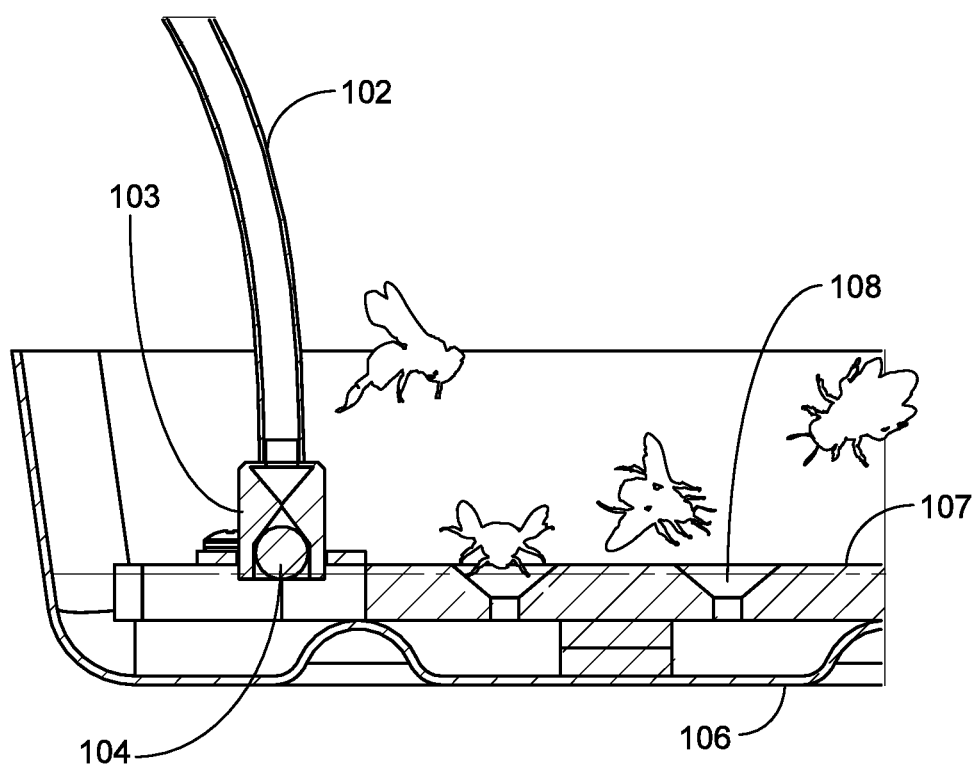
FIG. 3 exemplarily illustrates a sectional view about section X-X' of the bee feeding apparatus illustrated in FIG. 1.

FIG. 3 exemplarily illustrates a sectional view about section X-X' of the bee feeding apparatus 100 illustrated in FIG. 1. The regulating valve 103, is fed with a fluid, for example, sugar water, plain water, etc., using a gravity feed supply, or a city/well water supply through a ⅜-inch diameter fluid pipe. The regulating valve 103 maintains the required water level. In an embodiment, the regulating valve 103 is a miniature, plastic bodied float valve employing a partially hollow silicone rubber ball 104 that seals against an interior opening inside the cavity 108, and holds the water level just below the surface level of the countersunk sheet 107. In one embodiment, the float valve is made of plastic material. In another embodiment, the float valve has a molded food grade polypropylene plastic with a hollow rubber float/ball. The rubber float or ball is made of silicone material. The sheet 107 is easily lifted up out of the molded fluid tray member 106 and cleaned. The clean sheet 107 is then re-stored back into the fluid tray member 106. A lower part of the regulating valve 103 protrudes through the perforated sheet 107 and extends into the cavity 108 below. The float/ball works with the fluid, for example, pure water, sugar water, etc., and maintains the proper level of fluid that is about half the way down the cavity 108 height. The regulating valve 103 is rinsed clean, if it becomes clogged with calcium from the water or sugar from the sugared water. An upper part of the regulating valve 103 is threaded to mate with the fluid pipe, such as the ⅜-NPT fluid pipe.

Figure 4:
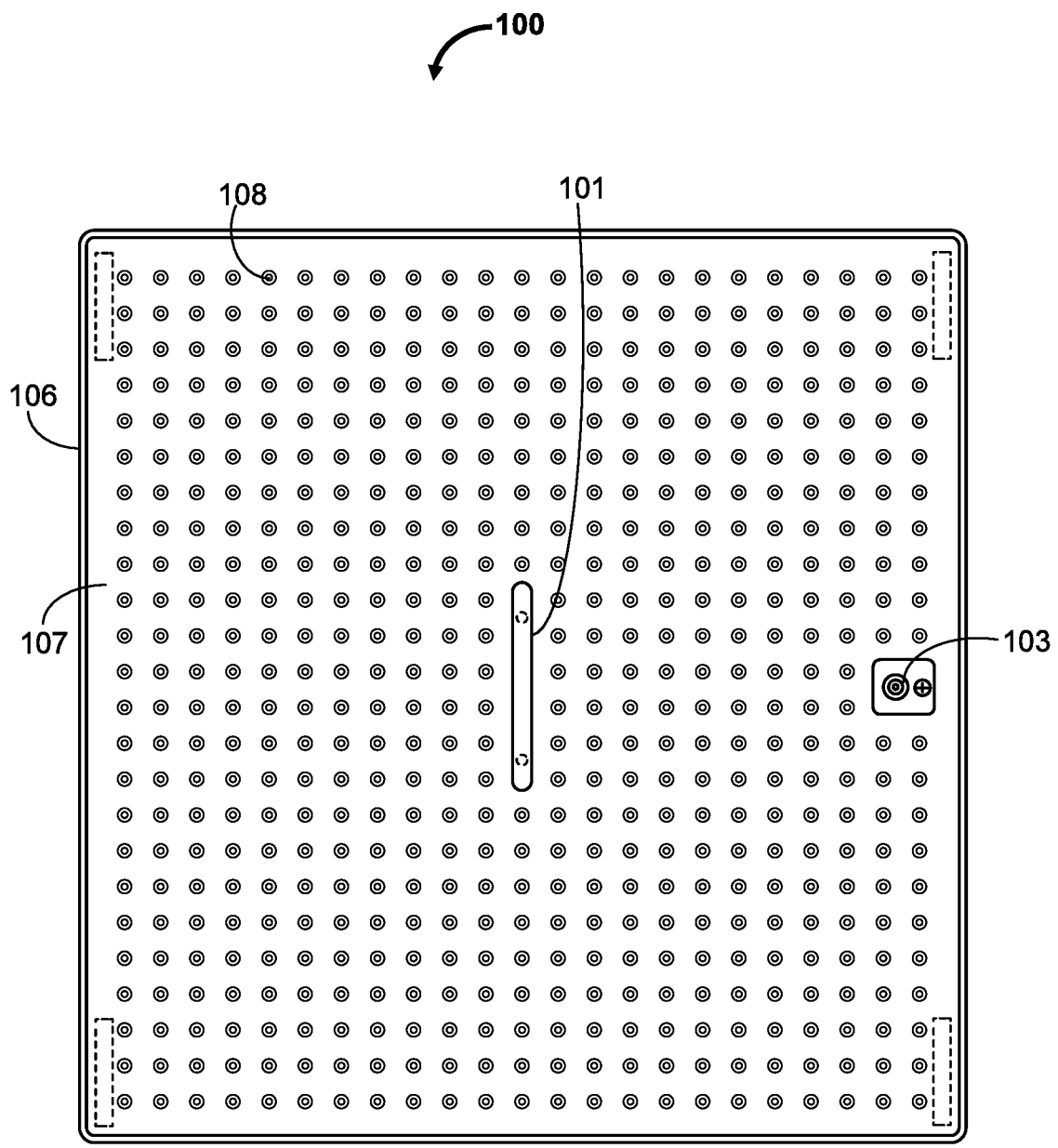
FIG. 4 exemplarily illustrates a top plan view of a bee feeding apparatus.

FIG. 4 exemplarily illustrates a top plan view of a bee feeding apparatus 100. The handle 101 enables a user to position the bee feeding apparatus 100 at the required location. At each corner, the fluid tray member 106 has a 2-inch long by ¼-inch wide by 1/16-inch thick block of 400-alloy stainless steel adhesively bonded to the interior of the fluid tray member 106. This block of stainless steel mates with the 5-pound pull magnetic strips 105 on the bottom of the perforated sheet 107, exemplarily illustrated in FIG. 4, holding it in place during use. In an embodiment, the sheet 107 is of a perforated configuration. The sheet 107 is about ¼-inch thick and made of a food grade, high-density polyethylene (HDPE) material water jet machined from 4-feet by 8 feet sheets of stock material. In this computer numerically controlled (CNC) machine, the water jet develops all the cavities 108 and rounded corners of the watering platform. The advantage of the water jet machining process is that, since there is no rolled edge the sheet 107 comes out as a finished product except for the countersunk cavities 108. This feature is developed on a CNC milling center, which counter bores each watering cavity 108 and adds threads to any hole requiring it. After both stages of milling are completed, the drilled 2-inch long by ¼-inch wide by 1/16-inch thick neodymium magnet blocks are installed on the bottom of the platform and the regulating valve 103 is attached to the top of the sheet 107 using one or more fasteners. The fastener for example is a stainless steel fastener. The sheet 107 has a commercially available handle 101 that is attached to the top of the sheet 107 to assist in removal or replacement.

Figure 5:
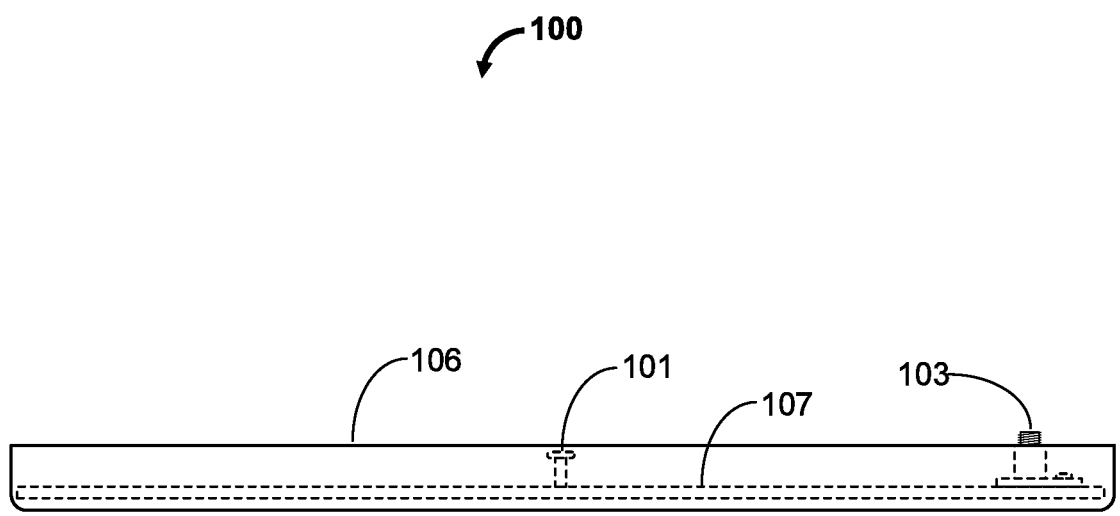
FIG. 5 exemplarily illustrates a side view of a bee feeding apparatus.

FIG. 5 exemplarily illustrates a side view of a bee feeding apparatus 100. The bee feeding apparatus 100 ensures improved bee hydration, feeding, and a significant reduction in bee deaths per hive by reducing chances of drowning of the bees. This is achieved by having small cavities 108 in a sheet 107 made of food safe plastic material. The fluid level in the cavities 108 provided in the sheet 107 seated in the fluid tray member 106 such that the level of the sugar water is just above the surface of the cavity 108. The level of fluid is maintained by the regulating valve 103, for example, a simple float valve to ensure the fluid level does not get too far above or below the set level. The bee feeding apparatus 100 provides a secure and flat surface on the sheet 103. The platform allows the bees a safe place to stand while they drink. Even if many bees flock to the fluid tray member 106 pushing the lower bees into the fluid, the fluid level is maintained by the fluid regulating valve 103 such that the bees do not drown. This enables bees being able to feed in large groups.

Figure 6:
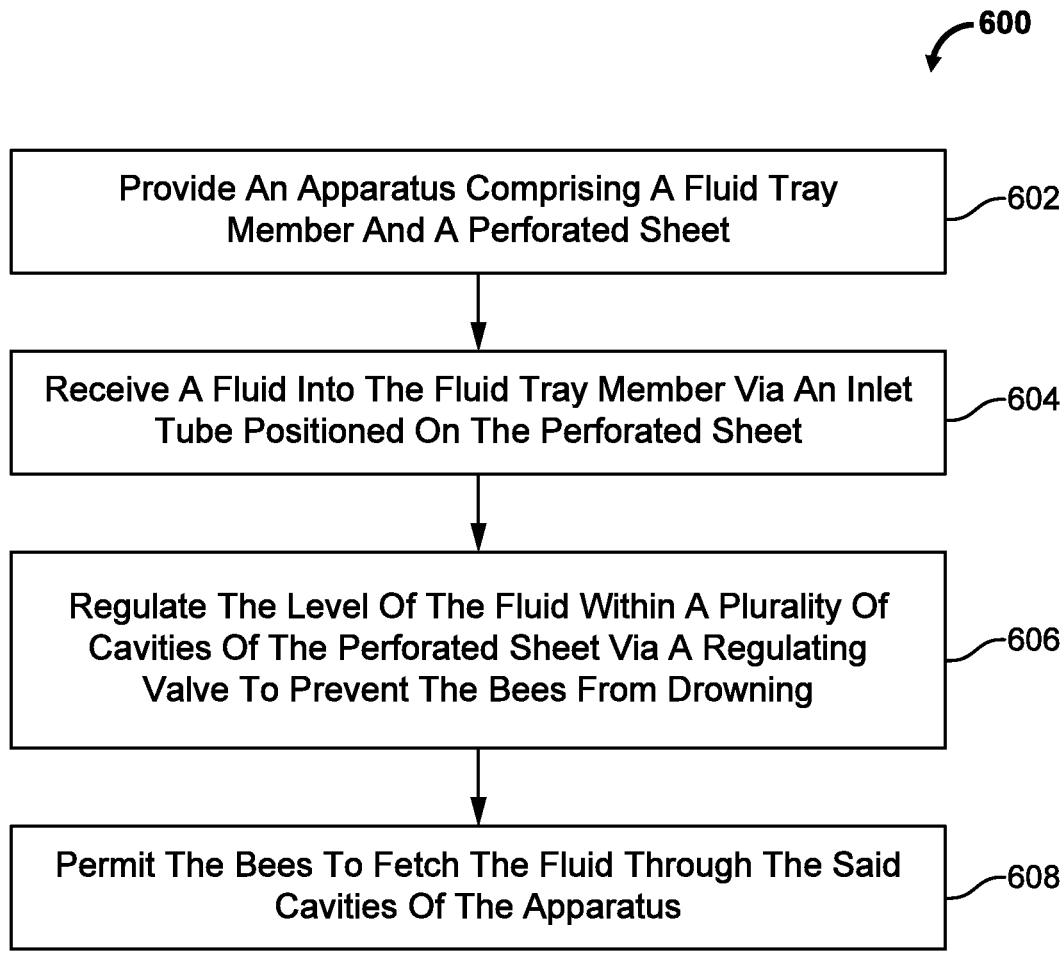
FIG. 6 exemplarily illustrates a method for feeding bees, according to an embodiment of the present invention.

FIG. 6 discloses a method of feeding bees using apparatus 100. The method comprising: In step 602, an apparatus comprising a fluid tray member 106 and a perforated sheet 107 is provided. In step 604, a fluid is received into the fluid tray member 106 via an inlet tube 102 positioned on the perforated sheet 107. At step 606, the level of the fluid within a plurality of cavities 108 is maintained via a regulating valve 103, preventing the bees from drowning. The regulating valve 108 positioned on the perforated sheet 107 is a float valve comprising a hollow silicone rubber ball, wherein the silicone rubber ball seals against an interior opening inside the cavity 108 of the perforated sheet 107, thereby holding the fluid level below the surface level of the perforated sheet. In step 608, the bees fetch the fluid from the apparatus 100 to feed themselves. The bees fetch the fluid from the said plurality of cavities 108 of the perforated sheet 107. The sheet 107 provides a flat surface around the cavities 108 to support the bees to stand, while drinking the fluid to protect them from drowning.

The foregoing examples have been provided merely for the purpose of explanation and are in no way to be construed as limiting of the bee feeding apparatus 100, disclosed herein. While the bee feeding apparatus 100 has been described with reference to various embodiments, it is understood that the words, which have been used herein, are words of description and illustration, rather than words of limitation. Further, although the bee feeding apparatus 100 has been described herein with reference to particular means, materials, and embodiments, the bee feeding apparatus 100 is not intended to be limited to the particulars disclosed herein; rather, the bee feeding apparatus 100 extends to all functionally equivalent structures, methods and uses, such as are within the scope of the invention. Although there has been shown and described the preferred embodiment of the present invention, it will be readily apparent to those skilled in the art that modifications may be made thereto.

What is claimed is:

1. An apparatus for feeding bees, comprising:
   a fluid tray member configured to hold a fluid for feeding the bees;
   a sheet detachably attached on the fluid tray member via one or more magnetic strips;
   a regulating valve attached to the sheet via one or more fasteners to maintain the level of the fluid, wherein the regulating valve is a float valve comprising a ball, wherein the ball seals against an interior opening inside a cavity, and maintains the fluid level below the surface level of the sheet; and
   a handle detachably connected to the sheet to enable a user to position the apparatus to a desired location, the handle being detachable from the sheet and adapted to reattach to a replacement sheet.

2. The apparatus of claim 1, wherein the sheet is a perforated sheet.

3. The apparatus of claim 1, wherein the sheet further comprises:
   an inlet tube for receiving fluid into the fluid tray member;
   a plurality of cavities to hold the fluid.

4. The apparatus of claim 3, wherein the handle is attached to the sheet via a fastener.

5. The apparatus of claim 1, wherein the float valve is made of plastic material.

6. The apparatus of claim 1, wherein the ball is a rubber ball that is made of silicone material.

7. The apparatus of claim 1, wherein the regulating valve comprises an upper part and a lower part, wherein the upper part of the regulating valve is threaded to mate with a fluid pipe, and the lower part of the regulating valve protrudes through the sheet and extends into a cavity of the sheet.

8. The apparatus of claim 1, wherein the fluid tray member is made of a stainless steel or alloy material, wherein the material is adhesively bonded to the interior of the fluid tray member.

9. The apparatus of claim 1, wherein the sheet detachably attached on the fluid tray member made of a stainless steel or alloy material, via the one or more magnetic strips.

10. The apparatus of claim 1, wherein the sheet is made of a high-density polyethylene (HDPE) material.

11. The apparatus of claim 1, wherein the fluid tray member further comprises one or more longitudinal curved ribs to strengthen the fluid tray member.

12. The apparatus of claim 1, wherein the thickness of the fluid tray member is 0.1 inch.

13. An apparatus to prevent bees from drowning while feeding a fluid, the apparatus comprising:
   a fluid tray member configured to receive fluid for feeding the bees;
   a perforated sheet positioned on the fluid tray member, the perforated sheet comprising:
      an inlet tube for feeding fluid into the fluid tray member; a plurality of cavities to hold the fluid within the cavities to facilitate feeding the bees upon sitting on the perforated sheet, and
      a handle detachably connected to the perforated sheet to enable a user to position the apparatus to a desired location, the handle being adapted to detach from the sheet and reattach to a replacement sheet; and
   a regulatory valve configured to regulate the level of the fluid in the plurality of cavities, wherein the regulating valve is a float valve comprising a ball, wherein the ball seals against an interior opening inside a cavity, and maintains the fluid level below the surface level of the sheet.

14. The apparatus of claim 13, wherein the handle is attached to the perforated sheet via one or more stainless steel fasteners.

15. The apparatus of claim 13, wherein the fluid tray member comprises one or more longitudinal curved ribs to strengthen the fluid tray member.

16. The apparatus of claim 13, wherein the perforated sheet is attached to the fluid tray member via one or more magnetic strips.

17. A method of feeding bees, the method comprising:
   providing an apparatus comprising a fluid tray member and a perforated sheet;
   receiving a fluid into the fluid tray member via an inlet tube positioned on the perforated sheet;
   regulating the level of the fluid within a plurality of cavities of the perforated sheet by a regulating valve for preventing the bees from drowning, wherein the regulating valve is a float valve comprising a ball, wherein the ball seals against an interior opening inside a cavity thereby holding the fluid level below the surface level of the perforated sheet;
   permitting the bees to access the fluid through the said cavities; and replacing the sheet by detaching a handle and reattaching the handle to a replacement sheet.

18. The method of claim 17, wherein the level of the fluid is maintained below the surface level of the perforated sheet by the regulating valve.

\* \* \* \* \*